July 15, 1958          L. J. NEID          2,842,891
DOOR STRUCTURE FOR PIGEON TRAPS
Original Filed Oct. 24, 1949          2 Sheets-Sheet 1
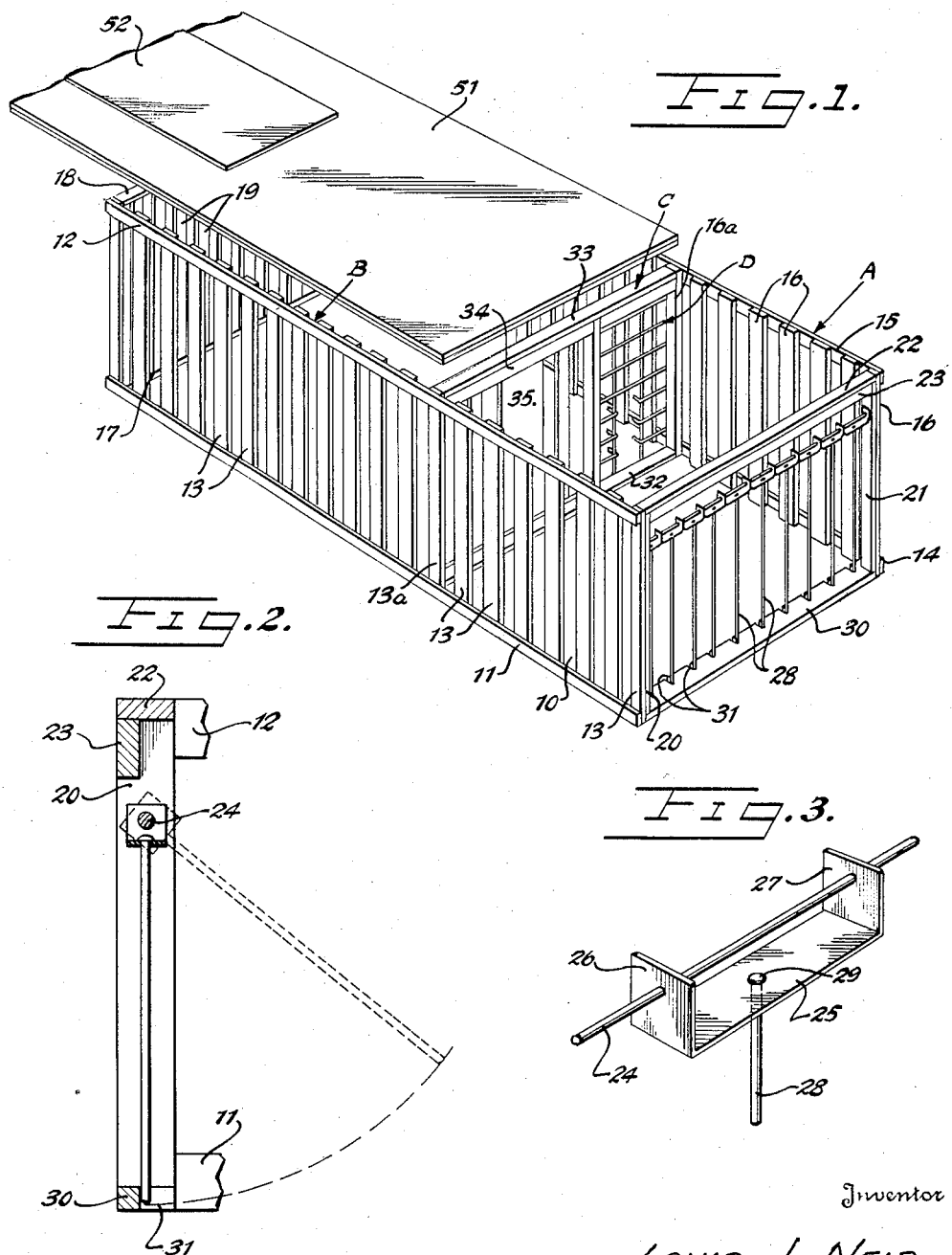
Inventor
LOUIS J. NEID
By Williamson, Williamson, Schroeder & Adams
ATTORNEYS July 15, 1958            L. J. NEID            2,842,891
DOOR STRUCTURE FOR PIGEON TRAPS
Original Filed Oct. 24, 1949            2 Sheets—Sheet 2
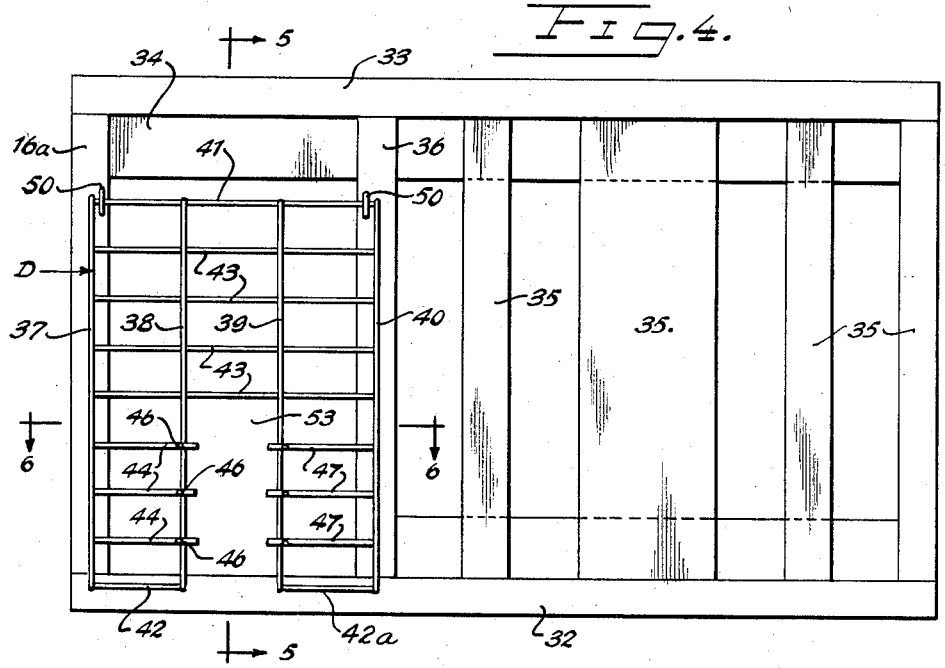
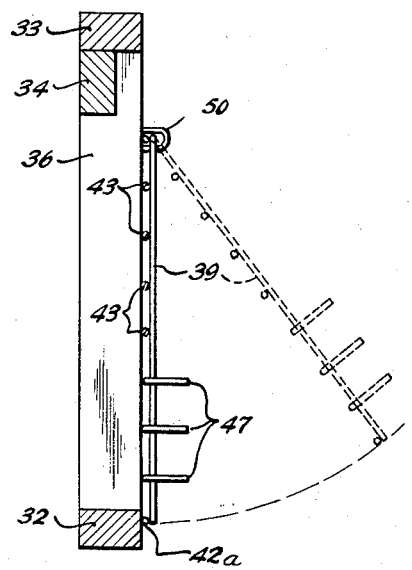
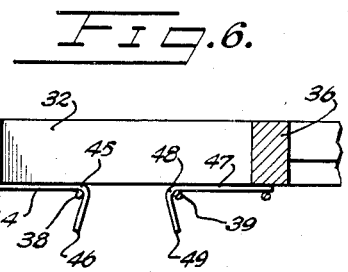
Inventor
LOUIS J. NEID
By Williamson, Williamson, Schroeder & Adams
ATTORNEYS United States Patent Office 2,842,891
Patented July 15, 1958

2,842,891
DOOR STRUCTURE FOR PIGEON TRAPS

Louis J. Neid, St. Paul, Minn.

Original application October 24, 1949, Serial No. 123,265, now Patent No. 2,693,050, dated November 2, 1954. Divided and this application October 5, 1954, Serial No. 460,366

4 Claims. (Cl. 43—66)

The present invention relates to pigeon traps and more particularly to a special type of door structure for use in connection therewith to trap scrub pigeons in live condition. The door structure herein described and claimed is a division of my earlier filed copending application entitled "Pigeon Traps" and assigned the Serial No. 123,265 on October 24, 1949, and which is now U. S. Patent No. 2,693,050.

As is commonly known, scrub pigeons constitute a severe nuisance, especially in urban areas, and their droppings cause considerable trouble both from the standpoint of sanitation and defacing of buildings and the like. Because the birds confine their activities and flight within and close to urban areas, it becomes impossible to dispose of them by means such as shooting and poisoning. Most urban areas have ordnances and laws prohibiting the use of inhumane devices for killing birds or animals and furthermore would not permit the use of dangerous weapons or chemicals which might endanger the lives of human beings in the area.

This invention contemplates a particular trap which can easily and successfully entice and entrap pigeons in a thorough and humane manner so that the birds may be periodically removed in live condition for proper and humane destruction. One of the greatest difficulties in trapping pigeons arises from the natural fears and suspicions of the bird which makes the pigeon wary but still does not drive him from his haunts. I have found that it is essential to instill a certain degree of confidence in the pigeons by providing first of all a trap which permits light and air to enter freely into all portions of the trap, and secondly to provide an imperfect collecting chamber which will tend to collect and congregate the birds by virtue of bait placed therein but will not frighten or disturb them because they can observe other birds or experience themselves the possibility of getting out of the first compartment without any degree of effort exerted by the bird. The imperfect trapping of the birds does, however, tend to crowd and temporarily maintain them in a rather closely-confined condition so that there is a tendency for the birds to seek egress in other portions of the compartment, especially after having fed upon the bait. The door structure which invites the birds to enter the second compartment without in any way frightening them or causing them to panic and yet which will provide a perfect barrier to prevent their escape from an inner compartment, constitutes the important subject matter of this invention.

It is therefore a general object of the invention to provide a door structure which will invite a pigeon to enter therethrough and will be operable to permit the entrance of the pigeon without frightening the bird and yet which will close behind the bird after its entry and positively discourage and prevent the exit of the bird by the same means.

It is a more specific object of the invention to provide a door which will permit a sufficient portion of the body of a pigeon to pass therethrough before operatively swinging to open position so that the bird will have complete confidence in continuing through the doorway, the bird ultimately being completely trapped after having passed therethrough.

Still more specifically, it is an object of the invention to provide a door structure in a double compartmented trap in which a medial area of the doorway permits the entrance of the head and neck of a bird before the door is operatively swung by the wings and shoulders of the bird to permit the bird to completely pass through the doorway, the same medial open area having means to discourage and prevent the bird from passing outwardly through the door or even attempting to return through the same passageway as it entered.

These and other objects and advantages of the invention will more fully appear from the following description made in connection with the accompanying drawings, wherein like reference characters refer to the same or similar parts throughout the views, and in which:

Fig. 1 is a perspective view of an improved pigeon trap constructed in accordance with the present invention and with the cover partly removed;

Fig. 2 is a vertical sectional view of the entrance gate;

Fig. 3 is an enlarged fragmentary detail view of the mounting for one of the swinging gate members;

Fig. 4 is a rear elevational view of the partition between the forward and rear compartments;

Fig. 5 is a vertical sectional view taken on the line 5—5 of Fig. 4 and looking in the direction of the arrows; and Fig. 6 is a horizontal sectional view taken on the line 6—6 of Fig. 4 and looking in the direction of the arrows.

Referring more particularly to the drawings, 10 indicates a floor of the improved trap and 11 and 12 represent lower and upper longitudinally extending side rails which may be of metal, for example, some alloy of aluminum. Slats or palings 13 are attached by welding or the like to the inner faces of the rails 11 and 12 in spaced apart relation, the spaces between the slats being of such a width as to prevent a pigeon escaping therethrough. Lower and upper side rails 14 and 15 are similar to and are disposed in parallel spaced apart relation to the side rails 11 and 12. Slats or palings 16 are secured as by welding to the inner faces of the rails 14 and 15 in the same spaced apart relation as the slats 13. The floor 10 is secured, as by welding, to the lower side rails 11 and 14.

The lower rails 11 and 14 are connected at their rear ends by a lower rear end rail 17 and the upper side rails 12 and 15 are connected by an upper rear end rail 18. Slats 19 have their lower end portions secured to the outer face of the rail 17 and their upper ends secured to the upper rear end rail 18, as by welding or the like.

The forward end of the trap is open and the foremost side slats of the slats 13 and 16 have secured thereto jambs 20 and 21, respectively, which are shorter than the slats 13 and 16 so that the upper and lower ends of the jambs 20 and 21 terminate short of the respective ends of the slats. A top rail 22 is secured to the inner faces of the foremost slats 13 and 16 and rests upon the upper ends of the jambs 20 and 21. A front piece or bracing member 23 extends between the jambs 20 and 21 and has its opposite ends secured to the inner faces of the jambs. A pivot rod 24 extends between the jambs 20 and 21 and is mounted on the upper end portions thereof.

A plurality of saddles are pivotally mounted on the rod 24 and each saddle is of substantially U-shape having a horizontally disposed body portion 25 and a pair of upstanding apertured spaced apart legs 26 and 27 which receive therethrough the rod 24. The body portion 25 of each saddle has a centrally disposed opening for the reception of a bar 28 which has an enlarged head 29 for abutting the upper surface of the body portion 25 adjacent the opening therein for maintaining the bar 28 in proper position upon the saddle. The length of the saddles is such that the bars 28 depending therefrom are so spaced apart that a pigeon cannot pass from the inside of the trap between two adjacent bars to the outside while the bars are in normal depending position.

The sill 30 is disposed in vertical alignment with the pivot rod 24 and the saddles and has in its rear edge portion a series of spaced apart notches 31 which correspond in number and are in alignment with the bars 28. The bars 28 are of sufficient length so that their lower end portions are received by the respective notches 31 of the sill 30 when the bars are in their normal closed position as shown in full lines in Fig. 2 of the drawing.

The trap is divided into a forward entrance or bait holding compartment or chamber generally indicated at A and a rear compartment or chamber generally indicated at B by a partition generally indicated at C. The partition C has a sill 32, the opposite ends of which are secured to the inner faces of the lower end portions of intermediate slats 13a and 16a, respectively. The partition includes a top rail 33 which is disposed in vertically spaced apart relation to the sill 32 and has its opposite ends secured to the inner faces of the upper end portions of the slats 13a and 16a, respectively. A front piece 34 is disposed beneath the top rail 33 and has its opposite ends secured to the inner faces of the upper end portions of the slats 13a and 16a, respectively.

A series of slats 35 have their lower and upper end portions secured to the sill 32 and the top rail 33, respectively, and are spaced apart so that a pigeon cannot pass between two adjacent slats. At one end of the partition C a doorway is provided which is normally masked by a door generally indicated at D. The slat 16a constitutes one of the jambs of this doorway and the other jamb which is indicated at 36 is secured to the sill 32 and to the top rail 33 and the front piece 34. The door comprises parallel spaced apart rods 37, 38, 39 and 40 which are connected at their upper ends by a pivot pin 41. Rods 37 and 38 are connected at their lower ends by stop bar 42 and rods 39 and 40 are connected at their lower ends by stop bar 42a.

A series of vertically spaced apart braces 43 are connected to the rods 37, 38, 39 and 40 at points disposed above their medial lines.

A plurality of vertically spaced apart guards 44 have their outer ends secured to the rod 37 and their opposite free end portions are bent as at 45 and extend rearwardly and preferably somewhat outwardly from this point 45 to terminate in points 46. In any event, the points 46 should not prematurely prick or prod the bird in its passageway through the gate. The guards 44 have their bent portions 45 secured to the rod 38. Guards 47, similar in construction and arrangement to the guards 45, have their outer ends secured to the rod 40 and their opposite free end portions bent as at 48 and extend rearwardly and outwardly from this point 48 and terminate in points 49. The guards 47 have their bent portions 48 secured to the rod 39.

The gate D is pivotally mounted on the rear upper portions of the jambs 16a and 36 by staples 50, which engage the pivot pin 41 at its opposite end portions. The stop bars 42 and 42a engage the rear face of the sill 32 to check the forward swinging of the gate. It will be noted that the gate D is constructed in a general open-mesh structure so that a pigeon can readily see through all portions thereof. Furthermore, an opening 53 is defined medially of the door structure which will permit entrance of the head and neck of a pigeon as will be more fully described hereinafter, the opening 53 extending completely through the bottom so as to present no obstruction to any portion of the bird as the gate relatively rises with respect to the pigeon's head and neck. Although it is the natural habit of pigeons to avoid stooping and crawling, I have found that they will enter an opening 53 which is vertically elongated as shown in Figs. 1 and 4 so that the height thereof is in the order of at least twice the width.

A cover 51 is disposed upon the trap and rests upon the upper rear end rail 18, the top rails 22 and 33. The cover 51 can be secured to these rails in any suitable manner. A lid 52 is mounted on the cover 51 and affords access to the interior of the trap. I sometimes prefer to construct the cover 51 of open-mesh material which will further increase the availability of light and air to the interior of the trap. In such event the lid 52 is mounted in the same manner so as to permit access to the interior of the trap through the cover.

In the operation of the trap it may be located in any suitable place where it is desired to eliminate the pigeons which have gathered there. A bait which may be in the form of food, not harmful in any way to bird life, but appealing to pigeons, is placed in the forward compartment A. This bait will attract the pigeon and in order to reach it, the pigeon will push against one or two of the bars 28 which will be freely swung inwardly on the pivot rod 24, as shown in dotted lines in Fig. 2 of the drawer, until the pigeon is entirely within the compartment A. As soon as the bar or bars 28 are relieved of the force exerted by the pigeon, they will return to their original vertical closed position with their lower end portions received by the notches 31 of the sill 30. The inner walls of the notches will check further forward swinging movement of the bars 28 to prevent the trapped pigeon from escaping by pushing the bars outwardly of the trap. The side walls of the notches will stop lateral movement of the bars 28 and thus preclude the possibility of the entrapped bird from pushing between two adjacent bars to escape. Since the bars 28 are individually mounted for independent swinging movement and only one or two of them need to be displaced by an entering pigeon, an entrapped bird cannot escape therefrom by himself. It is to be understood, however, that where a number of pigeons are simultaneously milling about within and without compartment A two or more of the individual bars 28 may be simultaneously displaced allowing some of the pigeons to pass in and out. Since those pigeons passing out establish confidence in the entire group, they will re-enter and serve as decoys for other pigeons.

During its movements within the forward compartment A, the entrapped pigeon will locate the door D and urged by its natural curiosity it will thrust its head and neck through the opening 53 of the door. Partial entrance will establish sufficient confidence in the bird to encourage him toward further effort. The body of the bird will then engage the guards 44 and 47 and further movement of the bird towards the door will cause the door to swing into the compartment B on the staples 50 to the dotted line position shown in Fig. 5, until the pigeon is entirely within the chamber B. As soon as the bird moves out of engagement with the door, it will return automatically to its original vertical closed position. At this time, the stop bars 42 and 42a engage the rear face of the sill 32 to arrest the forward movement of the door D and to prevent the opening of the door into the compartment A. If a pigeon in compartment B attempts to pass through the opening 53 of the door into the compartment A, its body will contact the pointed ends 46 and 49 of the guards 44 and 47, respectively, and it will be discouraged from further attempts to pass through the opening. Moreover, the divergent rear end portions of the guards are so spaced apart that a pigeon cannot enter therebetween and the distance between the guards 44 and 47 decreases in a forward direction to further preclude the possibility of the pigeons moving from the compartment B to the compartment A.

One of the advantages of having two separate compartments with a door permitting a bird to leave the bait containing chamber but not being able to return thereto is that after entering the bait chamber and eating some of the bait, the entrapped bird will then leave the bait chamber and thus the bait will be conserved. Another advantage inherent in this structure is that the previously entrapped birds will not remain in the bait compartment to trample and scatter the bait and to soil it with dung and the like, but new birds will be continuously entering, being decoyed by those presently in compartment A.

When the trap has become filled with pigeons, the trap can be emptied in situ or carried away to a suitable place for emptying. The birds may be removed from the trap by opening the lid 52 and withdrawing the pigeons through the opening in the cover 51. The cover 51 may be removably fitted to the trap to permit of access to both chambers A and B for cleaning and for re-baiting.

It will, of course, be understood that various changes may be made in the form, details, arrangement and portions of the various parts without departing from the scope of my invention.

What I claim is:

1. A gate construction for suspension in a door opening of a pigeon trap for limiting passage to one direction only, said gate comprising a plurality of rod members extending in the vertical dimension of the gate and spaced apart transversely thereof, a plurality of vertically spaced rod members extending transversely of the full width of the gate through approximately the top half thereof and joined to the vertical members, other vertically spaced rod members extending in a transverse direction across the vertical members from the outermost vertical members to and each terminating at an inner one of the vertical members, the said inner ones of the vertical members being adjacent to one another and the termination of said other transverse rod members thereat providing a vertically elongated opening therebetween through the gate, and means mounted peripherally of said opening presenting smooth surfaces for the entrance of a pigeon and presenting pointed elements at the other side for preventing the return of the pigeon.

2. A gate construction for suspension in a door opening of a pigeon trap for limiting passage to one direction only, said gate comprising a plurality of rod members extending in the vertical dimension of the gate and spaced apart transversely thereof, a plurality of vertically spaced rod members extending transversely of the full width of the gate through approximately the top half thereof and joined to the vertical members, other vertically spaced rod members extending in a transverse direction across the vertical members from the outermost vertical members to and each terminating at an inner one of the vertical members, the said inner ones of the vertical members being adjacent to one another and the termination of said other transverse rod members thereat providing a vertically elongated opening therebetween through the gate, and pointed elements carried by the said inner ones of the vertical members along the sides of said opening and all directed away from one side of the gate.

3. A gate construction for suspension in a door opening of a pigeon trap for limiting passage to one direction only, said gate comprising a plurality of rod members extending in the vertical dimension of the gate and spaced apart transversely thereof, a plurality of vertically spaced rod members extending transversely of the full width of the gate through approximately the top half thereof and joined to the vertical members, other vertically spaced rod members extending in a transverse direction across the vertical members from the outermost vertical members to and each terminating at an inner one of the vertical members, the said inner ones of the vertical members being adjacent to one another and the termination of said other transverse rod members thereat providing a vertically elongated opening therebetween through the gate, and pointed elements carried by the said inner ones of the vertical members along the sides of said opening and all directed away from one side of the gate, said pointed elements on the two sides of the opening being in divergent relation.

4. The invention according to claim 3 wherein said pointed elements constitute continuations of the said other vertically spaced rod members extending around the adjacent inner ones of the vertical members.

References Cited in the file of this patent

UNITED STATES PATENTS

| | | |
|---|---|---|
| 147,091 | Beach et al. | Feb. 3, 1874 |
| 383,700 | Brusie | May 29, 1888 |
| 590,032 | Anderson | Sept. 14, 1897 |
| 1,183,878 | Horovicz | May 23, 1916 |
| 1,857,341 | Abbink | May 10, 1932 |
| 2,105,879 | De Hart | Jan. 18, 1938 |
| 2,488,466 | Carver | Nov. 15, 1949 |
| 2,518,614 | Hain | Aug. 15, 1950 |
| 2,562,663 | Golaszewski | July 31, 1951 |